United States Patent [19]

Papenmeier

[11] Patent Number: 5,755,524
[45] Date of Patent: May 26, 1998

[54] CLEANING DEVICE

[76] Inventor: Friedrich Horst Papenmeier, Ob der Kluse 6, 58239, Schwerte, Germany

[21] Appl. No.: 593,083

[22] Filed: Jan. 29, 1996

[30] Foreign Application Priority Data

Feb. 3, 1995 [DE] Germany ............ 195 03 586.0

[51] Int. Cl.⁶ ........................................... G02C 13/00
[52] U.S. Cl. .................... 401/191; 401/9; 401/10; 401/119; 401/130; 401/199
[58] Field of Search ............... 401/9, 10, 191, 401/130, 119, 199

[56] References Cited

U.S. PATENT DOCUMENTS

| | | | |
|---|---|---|---|
| 2,055,314 | 9/1936 | Seburger | 401/10 |
| 2,620,499 | 12/1952 | Dressel | 401/119 |
| 2,623,228 | 12/1952 | Sherry | 401/130 |
| 2,908,923 | 10/1959 | Schlechter | 401/10 |
| 2,983,942 | 5/1961 | Hemstreet | 401/130 X |
| 3,056,998 | 10/1962 | Ebner | 401/10 X |
| 4,347,010 | 8/1982 | Petkoff. | |
| 4,546,517 | 10/1985 | Caniglia. | |
| 4,947,580 | 8/1990 | Moore | 401/10 X |

FOREIGN PATENT DOCUMENTS

| | | |
|---|---|---|
| 1008887 | 5/1957 | Germany. |
| 8027469.7 | 3/1981 | Germany. |
| 8414867.5 | 9/1984 | Germany. |
| 3412558 | 10/1985 | Germany. |
| 3716740 | 12/1988 | Germany. |
| 8903613.1 | 8/1989 | Germany. |
| 9113060.3 | 7/1992 | Germany. |
| 9209121.0 | 10/1992 | Germany. |
| 4207478.9 | 9/1993 | Germany. |
| 285197 | 8/1952 | Switzerland. |

*Primary Examiner*—Steven A. Bratlie
*Attorney, Agent, or Firm*—Renner, Otto, Boisselle & Sklar, P.L.L.

[57] ABSTRACT

The invention is directed to a cleaning device for spectacle glasses comprising a container for a cleaning liquid, a pair of wiper arms disposed thereon, whereby a wiper arm is swingably mounted each on two opposing sides of the container, further comprising an exchangeable cleaning element disposed on the free end of each wiper arm, and a wick system to supply the cleaning liquid from the container to the cleaning elements opposing the former in inoperative position.

12 Claims, 1 Drawing Sheet

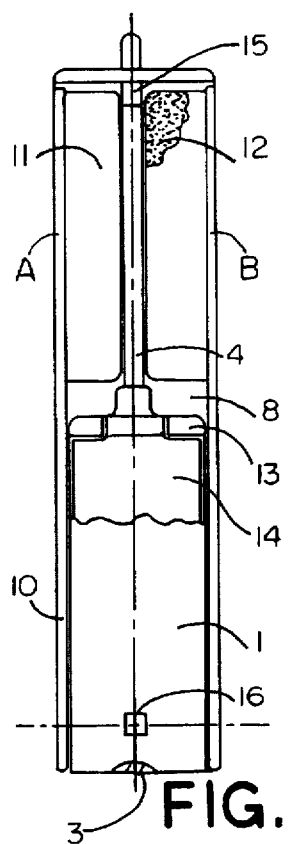
FIG. 1
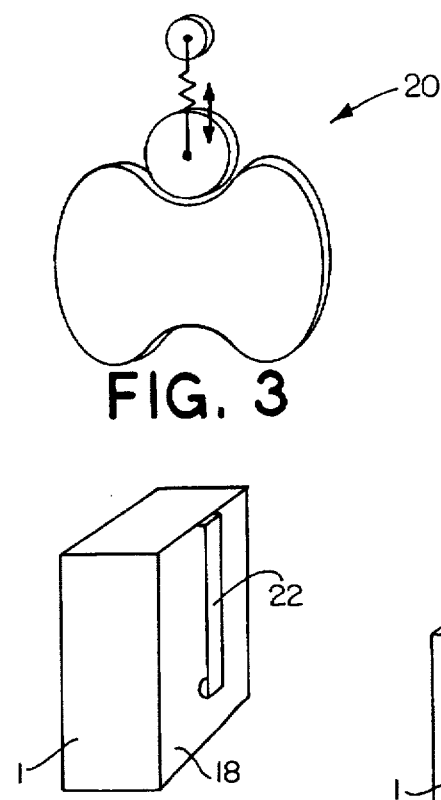
FIG. 3
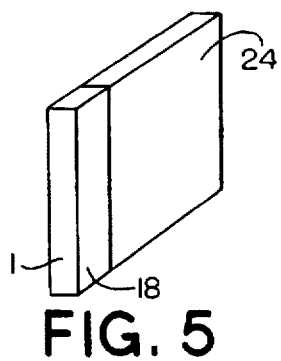
FIG. 4
FIG. 5
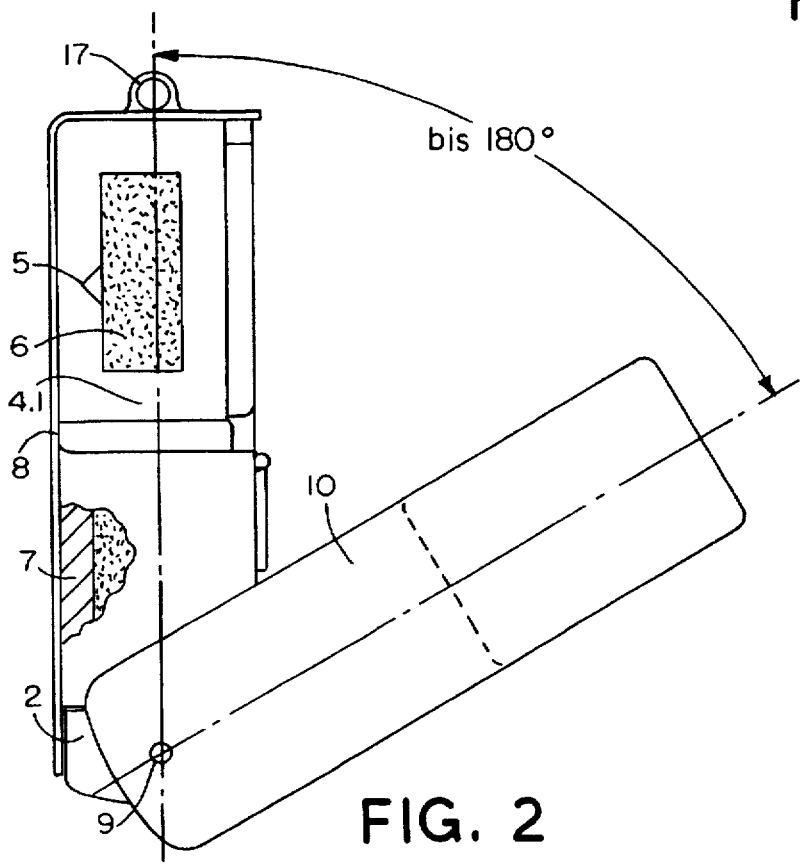
FIG. 2

CLEANING DEVICE

BACKGROUND OF THE INVENTION

1. Field of the Invention

The present invention relates to a cleaning device for spectacle glasses comprising a liquid container for a cleaning liquid, a pair of wiper arms disposed on the liquid container, an exchangeable cleaning element each disposed on the free end of each wiper arm, and a system to supply the cleaning liquid to the cleaning elements, and wherein a swingable wiper arm comprising at least an exchangeable cleaning element each disposed on the free end of the wiper arm is provided each on two opposing sides of the liquid container, wherein the cleaning liquid is transported to the cleaning elements via a wick system which is connected to the cleaning container; and wherein in inoperative position of the wiper arms the active sides of the cleaning elements are opposite to the two side walls of the wick system, from which they can obtain the cleaning liquid through at least one window each.

2. Description of the Prior Art

To ensure a clear sight for the user through the glasses of his spectacles the glasses have to be cleaned several times a day. So far this has been frequently done by applying a liquid film, for instance, by means of breathing on the glasses or by spraying a cleaning agent on the glasses which then are wiped clean by means of a small piece of soft cloth made of paper, textile, artificial leather or suede. Also known are special spectacle cleaning cloths impregnated with a cleaning agent, which come in a keep-fresh package.

The application of these means is inconvenient and furthermore produces unnecessary waste. For optimum cleaning of the spectacle glasses carrying along a separate cleaning agent is unpractical as well.

To remedy this, in accordance with the prior art a number of further spectacle cleaning aids and/or devices have been proposed and known, all of which, however, have not come on the market so far, because they, too, are not yet convenient enough.

(German Utility Model 80 27 469.7, German Utility Model 84 14 867.5, German Utility Model 89 03 613.1, German Utility Model 91 13 060.3, German Utility Model 92 09 121.0, German Offenlegungsschrift 1 008 887, German patent specification 34 12 558 A1, German patent specification 37 16 740 A1, German patent specification 42 07 478 A1, U.S. Pat. No. 4,546,517, U.S. Pat. No. 4,347,010).

Another known spectacle cleaning device (U.S. Pat. No. 4,347,010) comprises a tube-like casing in which a U-shaped, rigid pair of wiper arms is disposed, the ends of which are fitted with disk-shaped cleaning elements opposing each other. Below the U-bridge of the pair of wiper arms there is disposed a liquid balloon connected to the cleaning elements via a channel system in the U-bridge and the wiper arms. The device can be closed by means of a separate cover.

If this device is to be brought into working position, first of all the cover has to be removed and the pair of wiper arms is to be pulled out of the tube-like casing until the liquid balloon lies between two membranes opposing each other in the casing wall; being pressed with one's fingers the membranes act upon the liquid balloon, whereby the cleaning liquid is urged to flow to the cleaning elements, so that both sides of the spectacle glasses can be cleaned by the wiper movements.

However, said device has some disadvantages.

Thus, the transport of the cleaning liquid to the cleaning elements must take place via channels by means of a balloon pressure system and/or balloon pump system.

Furthermore, the relatively small liquid balloon must be refilled frequently.

With the filling level decreasing the device has to be turned upside down, if the cleaning liquid is to reach the cleaning elements by means of exerting pressure on the liquid balloon.

Another disadvantage constitutes the fact that the diameter and thus the active surface of the cleaning elements have to be kept small due to the oval cross-section of the casing, if it is also desired to put the device in the pockets of one's trousers or jacket.

Due to the fine channels in the wiper arms manufacture of the device is difficult and expensive for this reason. The unfastened cover which thus can be lost turns out to be unpractical.

For this reason, this proposal for a device has not lead to a marketable product either.

SUMMARY OF THE INVENTION

Therefore, the invention has as its object to provide a device wherein the above-mentioned disadvantages do not occur.

More particularly, it is intended to provide a device of simple construction, which can be easily handled by both young and elderly users.

This is achieved by a cleaning device for spectacle glasses comprising a liquid container for a cleaning liquid, a pair of wiper arms disposed on the liquid container, an exchangeable cleaning element each disposed on the free end of each wiper arm, and a system to supply the cleaning liquid to the cleaning elements, and wherein a swingable wiper arm comprising at least an exchangeable cleaning element each disposed on the free end of the wiper arm is provided each on two opposing sides of the liquid container, wherein the cleaning liquid is transported to the cleaning elements via a wick system which is connected to the cleaning container; and wherein in inoperative position of the wiper arms the active sides of the cleaning elements are opposite to the two side walls of the wick system, from which they can obtain the cleaning liquid through at least one window each.

Expedient embodiments are defined by the features of the subclaims.

BRIEF DESCRIPTION OF THE DRAWINGS

The invention is described in more detail hereinafter with the help of an example of embodiment by referring to the enclosed schematic drawing. In this drawing FIG. 1 shows a front view of an embodiment of the cleaning device, and FIG. 2 shows a side view of the cleaning device according to FIG. 1 with partially swung-down wiper arm.

FIG. 3 shows a cam arrangement.

FIG. 4 shows a perspective view of the cleaning device according to FIG. 1 with a pocket clip.

FIG. 5 shows a perspective view of the cleaning device according to FIG. 1 combined with a spectacle case.

The cleaning device for spectacle glasses shown in FIGS. 1 and 2 comprises a container 1 for a cleaning liquid 7 having an inserted bottom 2 and a captive filler screw 3 disposed therein. Above the liquid container 1 a wick guidance 4 with windows 5 on both sides is disposed in the middle, behind which there is a flat wick 6 which extends almost up to the bottom 2 in the cleaning liquid 7 in the liquid container 1. The liquid container 1 and the wick guidance 4 form a unit with a back wall angle 8.

On both sides of the liquid container 1 there is disposed in a center 9 a slightly resilient wiper arm 10 each which can be swung up to 180 degrees. The wiper arms 10 can be rigidly connected to each other, however, in a preferred embodiment they can be swung independently of each other. On the ends of the wiper arms 10 there are disposed opposing, approximately rectangular cleaning elements 11 consisting of a foam cushion 12 covered by a soft, absorbent wrapping on the active cleaning side.

The cleaning elements 11 are exchangeable in that they are designed detachably, for instance, by a detachable snap-in connection, adhesion or a Velcro fastener.

In inoperative position the cleaning elements 11, which in a preferred embodiment are elastic and rectangular, contact with their active cleaning sides the side walls of the wick guidance 4 by slight pressure of the wiper arms. The thickness of the side walls of the wick guidance 4 ensures a defined distance between the cleaning elements 11 and the flat wick 6 in the window 5, so that no cleaning liquid 7 transported via a wick system 4.1 is transferred in inoperative position.

If the latter is desired, this can be achieved by reducing the thickness of the side walls of the wick guidance 4 or by a flat wick 6 projecting in the window 5 to effect contact between the cleaning elements 11 and the flat wick 6.

The cleaning elements 11 are protected by the wiper arms 10 and the back wall angle 8 from three sides and from their front side. The front side of the cleaning elements 11 can also be closed by a flap 14 supported in another center 13, which in inoperative position of the device is held by a first magnetic clamp 15 and in working position of the device by a second magnetic clamp 16.

The cleaning of spectacles first of all requires the cleaning elements 11 to be wetted with the cleaning liquid 7. This can be done more or less automatically by means of swinging out the wiper arms 10, in that the slight pressure exerted on the two wiper arms 10 in points A and B with one's thumb and index finger also acts upon the cleaning elements 11, which thus come in contact with the cleaning liquid 7 through the window 5 via the flat wick 6. Alternatively, as pointed out in the above, it is possible to make the cleaning liquid 7 pass onto the cleaning elements 11 in inoperative position by means of a flat wick projecting in the window 5 and/or by reducing the thickness of the side walls of the wick guidance 4.

Upon swinging out the wiper arms 10 by up to 180 angular degrees to reach their desired working position the flap 14 held by the first magnetic clamp 15 in inoperative position is also simultaneously caused to fall off by the cleaning elements 11 and then is held by the second magnetic clamp 16.

The swung-out wiper arms 10 are arrested in working position, e.g. by means of cams 20 (as seen in FIG. 3, for example), so that the cleaning elements 11 are opposing each other. A swinging movement from the working position is possible only by applying an additional force overcoming the positive and/or non-positive arresting engagement.

Prepared in this manner, the cleaning device comprising the cleaning elements 11 is guided across a spectacle glass which thus can be cleaned on both sides at the same time.

After long use the cleaning elements 11 can easily be cleaned by means of a washing material dissolving fat and/or dirt. To have the device on hand at any time, it may also be put around one's neck; for this purpose there is provided an eyelet 17 for a necklace or string. If one wants to carry it along in one's jacket pocket this relatively flat device may also be provided with a pocket clip 22 (as seen in FIG. 4, for example) known as such.

The advantages of this spectacle cleaning device are to be found in its simple, strong construction as well as its simple manufacture, because the unit consisting of liquid container 1, wick guidance 4 and back wall angle 8 can be produced very efficiently as a thermoplastic component, for instance.

Another essential advantage is that the supply of the cleaning liquid 7 to the cleaning elements 11 via the wick system 4.1 takes place without any mechanically moved parts completely independently of the position, more or less automatically up to the last drop.

Another advantage for the user is that due to its small size (about 75×20×15 mm) the cleaning device may be carried along without problems; in addition, it may easily be combined with a spectacle case 24 (as seen in FIG. 5, for example), and it is easy to handle.

I claim:

1. Cleaning device for spectacle glasses comprising a liquid container for a cleaning liquid, a pair of wiper arms disposed on the liquid container, an exchangeable cleaning element each disposed on the free end of each wiper arm, and a system to supply the cleaning liquid to the cleaning elements, and wherein a swingable wiper arm comprising at least an exchangeable cleaning element each disposed on the free end of the wiper arm is provided each on two opposing sides of the liquid container, wherein the cleaning liquid is transported to the cleaning elements via a wick system which is connected to the cleaning container; and wherein in inoperative position of the wiper arms the active sides of the cleaning elements are opposite to the two side walls of the wick system, from which they can obtain the cleaning liquid through at least one window each.

2. Cleaning device according to claim 1, in which the transfer of the cleaning liquid from the wick system to the cleaning elements is supported by the pressure exerted on the wiper arm by one's fingers, which is produced upon swinging out the wiper arms, thereby bringing the cleaning elements into contact with the side walls of the wick system.

3. Cleaning device according to claim 1, in which also in inoperative position of the wiper arms and without any external application of force the cleaning liquid is transferred from the wick system to the cleaning elements abutting on the side walls of the wick system.

4. Cleaning device according to claim 1, in which the liquid container and a wick guidance form a unit with a back wall angle of the container.

5. Cleaning device according to claim 1, in which the open side of the cleaning elements can be closed by a flap.

6. Cleaning device according to claim 5, in which the flap is held by permanent magnets, depending on the position of the wiper arms.

7. Cleaning device according to claim 1, in which the cleaning elements are approximately rectangular.

8. Cleaning device according to one claim 1, in which the two wiper arms which can be swung independently of each other can be arrested in at least one working position by positive and/or non-positive engagement, in particular by cams in such a way that the cleaning elements are lying opposite each other.

9. Cleaning device according to claim 1, in which the liquid container comprising a wick guidance and a back wall angle of the container as well as the two wiper arms are made of a thermoplastically mouldable material, in particular a thermoplast.

10. Cleaning device according to claim 1, in which it is provided with a pocket clip.

11. Cleaning device according to claim 1, in combination with a spectacle case.

12. Cleaning device according to claim 1, in which an inserted bottom of the liquid container comprises a captive filler screw.

* * * * *